US012320296B2

(12) United States Patent
Mohammed et al.

(10) Patent No.: US 12,320,296 B2
(45) Date of Patent: Jun. 3, 2025

(54) AIRCRAFT ENGINE ASSEMBLY FOR CONTROLLING ENGINE OIL FLOW DURING FIRE CONDITIONS AND METHOD FOR USING SAME

(71) Applicant: Pratt & Whitney Canada Corp., Longueuil (CA)

(72) Inventors: Kashif Mohammed, Brossad (CA); Vivek Bhat, Westmount (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/243,480

(22) Filed: Sep. 7, 2023

(65) Prior Publication Data
US 2025/0084790 A1    Mar. 13, 2025

(51) Int. Cl.
*F02C 7/057* (2006.01)
*A62C 3/08* (2006.01)
*F02C 7/042* (2006.01)
*F02C 7/25* (2006.01)
*B64D 33/02* (2006.01)

(52) U.S. Cl.
CPC .............. *F02C 7/057* (2013.01); *A62C 3/08* (2013.01); *F02C 7/042* (2013.01); *F02C 7/25* (2013.01); *B64D 2033/0213* (2013.01)

(58) Field of Classification Search
None
See application file for complete search history.

(56) References Cited

U.S. PATENT DOCUMENTS

| | | | | |
|---|---|---|---|---|
| 2,991,845 A | * | 7/1961 | Scheffler, Jr. | ........... F01D 25/20 184/6.13 |
| 5,265,408 A | * | 11/1993 | Sheoran | ................. B64D 33/08 60/262 |
| 5,655,359 A | * | 8/1997 | Campbell | .............. B64D 33/08 244/58 |

(Continued)

OTHER PUBLICATIONS

Search report for EP24199268.4 dated Jan. 8, 2025.

*Primary Examiner* — Todd E Manahan
*Assistant Examiner* — Marc Amar
(74) *Attorney, Agent, or Firm* — Getz Balich LLC

(57) ABSTRACT

An assembly for an aircraft includes an aircraft housing, an auxiliary power unit (APU), an oil system, a door actuator, and a controller. The aircraft housing forms a compartment. The aircraft housing includes an intake door. The intake door is movable between a closed position, an open position, and intermediate positions between the closed position and the open position. The APU is disposed within the compartment. The APU includes an engine. The engine includes an air inlet and a rotational assembly. The oil pump is operatively connected to the rotational assembly. The door actuator is operatively connected to the intake door. The door actuator is operable to position the intake door in the closed position, the open position, and the intermediate positions to control an ambient air flow to the air inlet. The controller is operatively connected to the door actuator. The controller is configured to identify a fire condition within the compartment, identify a fire position of the intake door, and control the door actuator to position the intake door in the fire position. The fire position is one of the open position or the intermediate positions.

20 Claims, 3 Drawing Sheets

(56) References Cited

U.S. PATENT DOCUMENTS

| | | |
|---|---|---|
| 7,540,142 B2 | 6/2009 | Sheoran |
| 10,239,632 B2 | 3/2019 | Manoukian |
| 10,273,823 B2 | 4/2019 | Marcus |
| 2004/0194975 A1* | 10/2004 | Trumper ............... B64D 41/00 169/35 |
| 2006/0071123 A1* | 4/2006 | Nguyen ................. B64D 41/00 244/76 R |
| 2006/0075754 A1* | 4/2006 | Champion ................ F02C 7/36 60/772 |
| 2009/0045014 A1* | 2/2009 | Delaloye ................. F01D 25/20 184/6.1 |
| 2011/0303491 A1* | 12/2011 | Jenkins ................... F16C 17/20 184/7.4 |
| 2012/0312023 A1* | 12/2012 | Ertz ......................... F02C 7/06 60/39.08 |
| 2013/0074519 A1* | 3/2013 | Ertz ........................ F02C 7/057 60/802 |
| 2016/0152344 A1* | 6/2016 | Palomares Mora ...... F01D 5/02 244/58 |
| 2017/0335711 A1* | 11/2017 | Marcus .................... F04D 17/10 |
| 2018/0156139 A1* | 6/2018 | Waissi .................... F02C 7/232 |
| 2018/0237152 A1 | 8/2018 | Manoukian |
| 2018/0237153 A1* | 8/2018 | Manoukian ............ B64D 41/00 |
| 2018/0283283 A1 | 10/2018 | Manoukian |
| 2022/0195946 A1* | 6/2022 | Parsons ................... F02C 7/262 |

\* cited by examiner

AIRCRAFT ENGINE ASSEMBLY FOR CONTROLLING ENGINE OIL FLOW DURING FIRE CONDITIONS AND METHOD FOR USING SAME

TECHNICAL FIELD

This disclosure relates generally to aircraft engines and, more particularly, to systems and methods for controlling oil flow in an aircraft engine in response to a fire condition.

BACKGROUND OF THE ART

Aircraft engines such as those used for propulsion systems and auxiliary power units (APUs) may be subject to various fire safety design constraints. For example, aircraft engines may be configured to demonstrate resistance to damage and fuel leakage when exposed to fire conditions. Various systems and methods are known in the art for facilitate aircraft engine fire resistance and fireproofing. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft includes an aircraft housing, an auxiliary power unit (APU), an oil system, a door actuator, and a controller. The aircraft housing forms a compartment within the aircraft housing. The aircraft housing includes an intake door. The intake door is movable between a closed position, an open position, and intermediate positions between the closed position and the open position. The APU is disposed within the compartment. The APU includes an engine. The engine includes an air inlet and a rotational assembly. The air inlet is fluidly connected to the intake door. The intake door in the closed position blocks airflow to the air inlet. The intake door in the open position allows airflow to pass to the air inlet. The oil system includes an oil pump. The oil pump is operatively connected to the rotational assembly to be driven by rotation of the rotational assembly to pump oil through the oil system. The door actuator is operatively connected to the intake door. The door actuator is operable to position the intake door in the closed position, the open position, and the intermediate positions to control an ambient air flow to the air inlet. The controller is operatively connected to the door actuator. The controller includes a processor in communication with a non-transitory memory storing instructions, which instructions when executed by the processor, cause the processor to identify a fire condition within the compartment, identify a fire position of the intake door in response to identification of the fire condition, and control the door actuator to position the intake door in the fire position. The fire position is one of the open position or the intermediate positions.

In any of the aspects or embodiments described above and herein, the fire position may be a predetermined one of the intermediate positions.

In any of the aspects or embodiments described above and herein, the instructions, when executed by the processor, may further cause the processor to determine the fire position based on one or more measured ambient air flow conditions for the aircraft.

In any of the aspects or embodiments described above and herein, the one or more measured ambient air flow conditions include an altitude, an ambient air pressure, an ambient air temperature, and an airspeed.

In any of the aspects or embodiments described above and herein, the instructions, when executed by the processor, may further cause the processor to measure an oil flow rate of the oil through the oil system using an oil flow sensor and modulate the fire position based on the measured oil flow rate.

In any of the aspects or embodiments described above and herein, the instructions, when executed by the processor, may further cause the processor to measure a rotation speed of the rotational assembly using a shaft rotation speed sensor and modulate the fire position based on the measured rotation speed.

In any of the aspects or embodiments described above and herein, the assembly may further include a fire detection system. The fire detection system may include at least one fire-detection sensor disposed within the compartment. The at least one fire-detection sensor may be connected in signal communication with the controller. The controller may identify the fire condition within the compartment using the at least one fire-detection sensor.

In any of the aspects or embodiments described above and herein, the oil system may include a fuel-oil heat exchanger. The oil pump may be configured to pump the oil through the fuel-oil heat exchanger.

In any of the aspects or embodiments described above and herein, the oil system may include an oil cooler. The oil pump may be configured to pump the oil through the oil cooler.

In any of the aspects or embodiments described above and herein, the instructions, when executed by the processor, may cause the processor to control the door actuator to position the intake door in the fire position with the APU in a shutdown condition.

According to another aspect of the present disclosure, a method for controlling an oil flow rate for an oil system of an auxiliary power unit (APU) for an aircraft includes identifying a fire condition within a compartment. The APU is disposed within the compartment. The method further includes identifying a fire position of an intake door of the aircraft in response to identification of the fire condition and controlling the oil flow rate through the oil system by controlling a door actuator to position the intake door in the fire position to direct ambient air to the APU to drive rotation of a rotational assembly of the APU, driving an oil pump of the oil system with the rotational assembly, and directing oil through the oil system with the oil pump.

In any of the aspects or embodiments described above and herein, the method may further include placing the APU in a shutdown condition in response to identification of the fire condition.

In any of the aspects or embodiments described above and herein, the method may further include determining the fire position based on one or more measured ambient air flow conditions.

In any of the aspects or embodiments described above and herein, the one or more measured ambient air flow conditions may include an altitude, an ambient air pressure, an ambient air temperature, and an airspeed.

In any of the aspects or embodiments described above and herein, the method may further include measuring the oil flow rate and controlling the fire position based on the measured oil flow rate.

According to another aspect of the present disclosure, an assembly for an aircraft includes an aircraft housing, an engine, an oil system, a fire detection system, and air intake system, and a controller. The aircraft housing forms a compartment within the aircraft housing. The aircraft housing includes an intake door. The intake door is movable between a closed position, an open position, and intermediate positions between the closed position and the open position. The engine is disposed within the compartment. The engine includes an air inlet and a rotational assembly. The air inlet is fluidly connected to the intake door. The intake door in the closed position blocks airflow to the air inlet. The intake door in the open position and the intermediate positions allows airflow to pass to the air inlet. The oil system includes an oil pump. The oil pump is operatively connected to the rotational assembly to be driven by rotation of the rotational assembly to pump oil through the oil system. The fire detection system includes at least one fire-detection sensor within the compartment. The air intake system includes a door actuator operatively connected to the intake door. The door actuator is operable to position the intake door in the closed position, the open position, and the intermediate positions to control an ambient air flow to the air inlet. The controller is operatively connected i to the door actuator and the at least one fire-detection sensor. The controller includes a processor in communication with a non-transitory memory storing instructions, which instructions when executed by the processor, cause the processor to identify a fire condition within the compartment using the at least one fire-detection sensor and control the door actuator to position the intake door in a fire position in response to identification of the fire condition. The fire position is one of the open position or the intermediate positions.

In any of the aspects or embodiments described above and herein, the fire position may be a predetermined one of the intermediate positions.

In any of the aspects or embodiments described above and herein, the instructions, when executed by the processor, may further cause the processor to determine the fire position based on one or more of an ambient air pressure, an ambient air temperature, or an airspeed for the aircraft.

In any of the aspects or embodiments described above and herein, the instructions, when executed by the processor, may further cause the processor to measure an oil flow rate of the oil through the oil system and modulate the fire position based on the measured oil flow rate.

In any of the aspects or embodiments described above and herein, the instructions, when executed by the processor, may further cause the processor to control the door actuator to position the intake door in the fire position with the engine in a shutdown condition.

The present disclosure, and all its aspects, embodiments and advantages associated therewith will become more readily apparent in view of the detailed description provided below, including the accompanying drawings.

DETAILED DESCRIPTION

Figure 1:
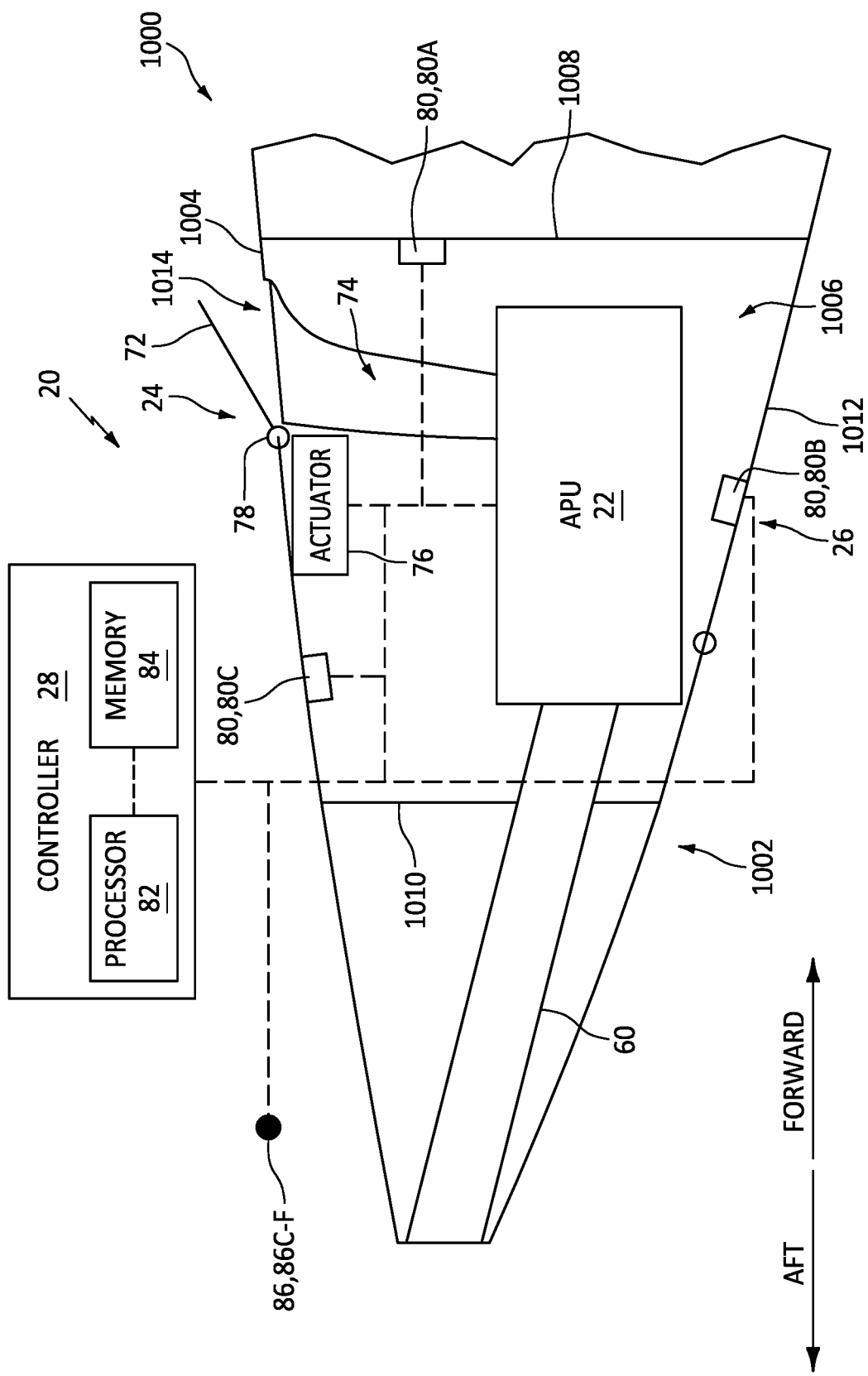
FIG. 1 schematically illustrates a cutaway, side view of a portion of an aircraft including an auxiliary power unit (APU) assembly, in accordance with one or more embodiments of the present disclosure.

FIG. 1 illustrates a portion of an aircraft 1000. In particular, FIG. 1 illustrates a cutaway view of a tail section 1002 (e.g., an aft end) for the aircraft 1000. The aircraft 1000 of FIG. 1 is configured as a fixed-wing aircraft (e.g., an airplane). However, the present disclosure is equally applicable to other aircraft 1000 configurations such as, but not limited to, a rotary-wing aircraft (e.g., a helicopter), a tilt-rotor aircraft, a tilt-wing aircraft, or any other aerial vehicle. Moreover, the aircraft 1000 may be a manned aerial vehicle or an unmanned aerial vehicle (UAV, e.g., a drone).

The aircraft 1000 of FIG. 1 includes a housing 1004 (e.g., a fuselage) forming a portion of the tail section 1002. The housing 1004 forms and surrounds (e.g., extends circumferentially about) an auxiliary power unit (APU) compartment 1006 of the aircraft 1000. The housing 1004 may form or otherwise include a firewall 1008 and/or an exhaust bulkhead 1010. The firewall 1008 may form a forward boundary of the APU compartment 1006. The firewall 1008 may separate the APU compartment 1006 from other equipment and/or compartments of the aircraft 1000. For example, the firewall 1008 may isolate the APU compartment 1006 from other portions of the aircraft 1000 to protect the other portions of the aircraft 1000 in the rare event of a fire in the APU compartment 1006. The exhaust bulkhead 1010 may form an aft boundary of the APU compartment 1006. The housing 1004 may include one or more doors 1012 facilitating access to the APU compartment 1006 from an exterior of the aircraft 1000. The present disclosure, however, is not limited to the foregoing exemplary configuration of the aircraft 1000 and its housing 1004.

The aircraft 1000 of FIG. 1 further includes an APU assembly 20 disposed in the tail section 1002. The present disclosure, however, is not limited to any particular location of the APU assembly 20 on the aircraft 1000. The APU assembly 20 of FIG. 1 includes an APU 22, an air intake system 24, a fire-detection system 26, and a controller 28.

Figure 2:
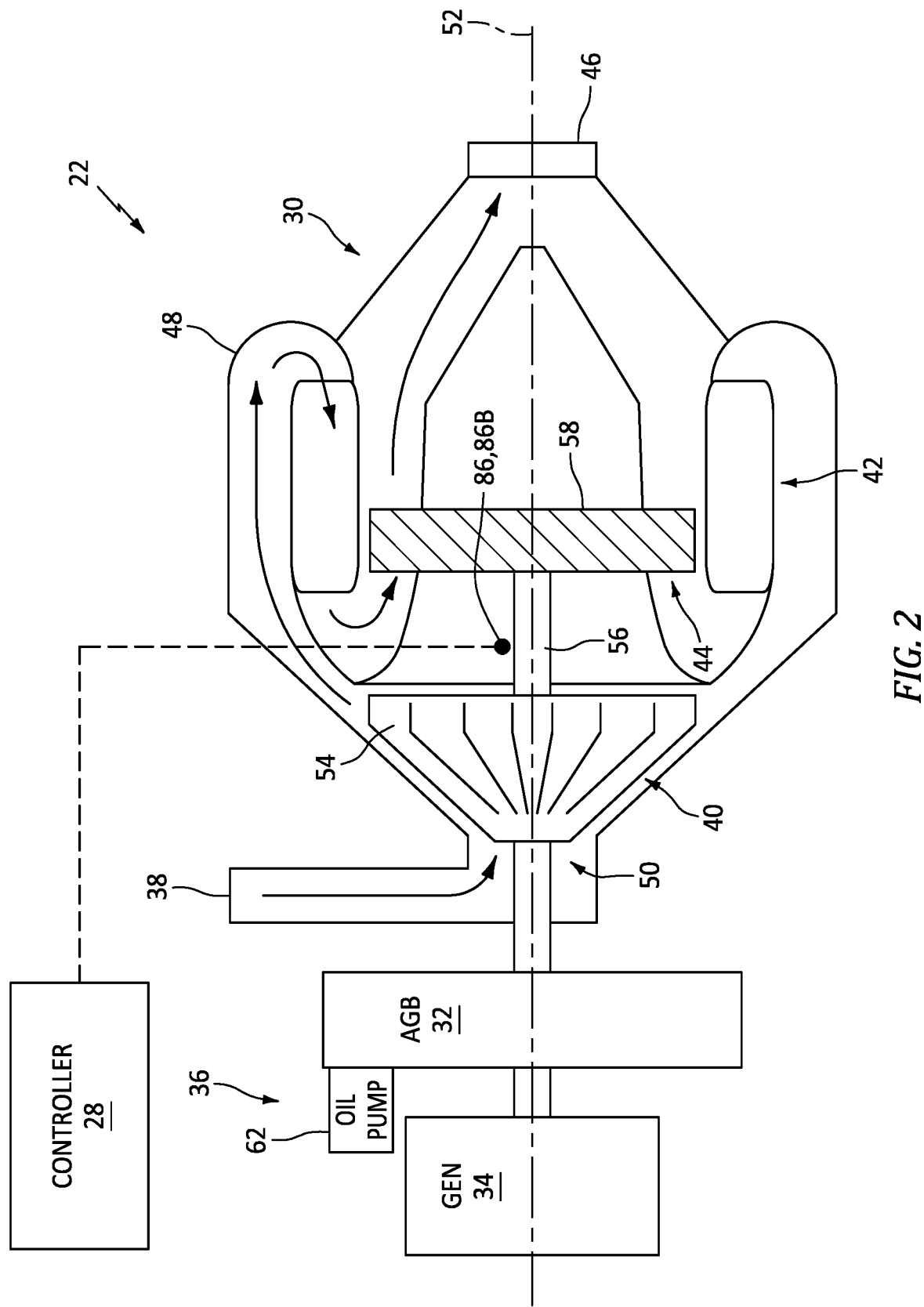
FIG. 2 schematically illustrates a cutaway, side view of an APU assembly for an aircraft, in accordance with one or more embodiments of the present disclosure.

FIG. 2 schematically illustrates a cutaway, side view of the APU 22. The APU 22 is configured to supply electricity, compressed air (e.g., compressor bleed air), hydraulics, or other functionality for the aircraft 1000. For example, the APU 22 may supply electricity and/or compressed air to the aircraft 1000 while one or more propulsion systems of the aircraft are inoperative, for example, when the aircraft 1000 is on the ground. The APU 22 may also operate to supply electricity or compressed air for starting one or more propulsion systems of the aircraft 1000. The APU 22 of FIG. 2 includes a gas turbine engine 30, a gearbox 32 (e.g., an accessory gearbox (AGB), a generator 34, and an oil system 36.

The gas turbine engine 30 of FIG. 2 includes an air inlet 38, a compressor 40, a combustor 42 (e.g., an annular combustor), a turbine 44, an exhaust 46, and an engine static structure 48. The engine static structure 48 may include, for example, one or more engine cases for the gas turbine engine 30. The engine static structure 48 may additionally include cowlings, bearing assemblies, or other structural components of the gas turbine engine 30. The one or more engine cases form, house, and/or structurally support the gas turbine engine 30 components 38, 40, 42, 44, and 46. It should be understood that the APU 22 and its gas turbine engine 30 of FIG. 2 are exemplary and the present disclosure is not limited to the particular APU 22 and/or gas turbine engine 30 configuration of FIG. 2.

The compressor 40 and the turbine 44 are formed, in part, by a rotational assembly 50 (e.g., a spool) of the gas turbine engine 30. The rotational assembly 50 is mounted for rotation about an axial centerline 52 of the gas turbine engine 30 relative to the engine static structure 48. The rotational assembly 50 includes a bladed compressor rotor 54 (e.g., a centrifugal impeller) for the compressor 40, a shaft 56, and a bladed turbine rotor 58 for the turbine 44. The shaft 56 interconnects the bladed compressor rotor 54 and the bladed turbine rotor 58. The shaft 56 is additionally coupled to the gearbox 32 (e.g., a gear assembly of the gearbox 32).

During operation of the gas turbine engine 30 of FIG. 2, ambient air enters the gas turbine engine 30 through the air inlet 38. The air is compressed by the bladed compressor rotor 54 and directed into a combustion chamber of the combustor 42. Fuel is injected into the combustion chamber and mixed with the compressed air to form a fuel-air mixture. This fuel-air mixture is ignited, and combustion products thereof flow through and cause the bladed turbine rotor 58 to rotate. The rotation of the bladed turbine rotor 58 drives rotation of the rotational assembly 50. The combustion exhaust gas flowing past the bladed turbine rotor 58 is directed out of the gas turbine engine 30 through the exhaust 46. The exhaust 46 may be connected to an exhaust duct 60 to direct the exhaust gas from the gas turbine engine 30 out of the aircraft 1000, for example, at an aft end of the aircraft 1000 (see FIG. 1).

The gearbox 32 is connected to the shaft 56, as previously discussed. In particular, the gearbox 32 includes a gear assembly (e.g., an epicyclic gear assembly) connected to the shaft 56, which gear assembly is configured to be driven by rotation of the shaft 56. The gearbox 32 may be configured as a speed-changing gearbox. For example, the gearbox 32 may be configured to drive rotation of the generator 34 (e.g., an input shaft of the generator 34) and/or other accessory loads (e.g., a starter-generator, an oil pump, a hydraulic pump, etc.) at a different (e.g., a reduced) rotation speed relative to the shaft 56.

The generator 34 is connected to the gearbox 32 (e.g., a gear assembly of the gearbox 32). The generator 34 is configured to be driven by the gearbox 32 to generate electrical power for the aircraft 1000 and/or its propulsion systems. For example, the generator 34 may be configured to supply electrical power for electrical loads of the aircraft 1000 such as, but not limited to, aircraft control systems, environmental control systems (ECS), lighting, and the like.

The oil system 36 is configured to supply oil to the gas turbine engine 30 for lubrication and cooling of gas turbine engine 30 components (e.g., bearing assemblies, the shaft 56, etc.), as well as for other support functions for the APU 22. The oil system 36 of FIG. 2 includes an oil pump 62. The oil pump 62 is operatively connected (e.g., coupled) to the rotational assembly 50 (e.g., the shaft 56) by a gearbox 32 (e.g., a gear assembly of the gearbox 32). The oil pump 62 is configured to be driven by rotation of the rotational assembly 50 through the gearbox 32 to direct oil through the oil system 36.

Figure 3:
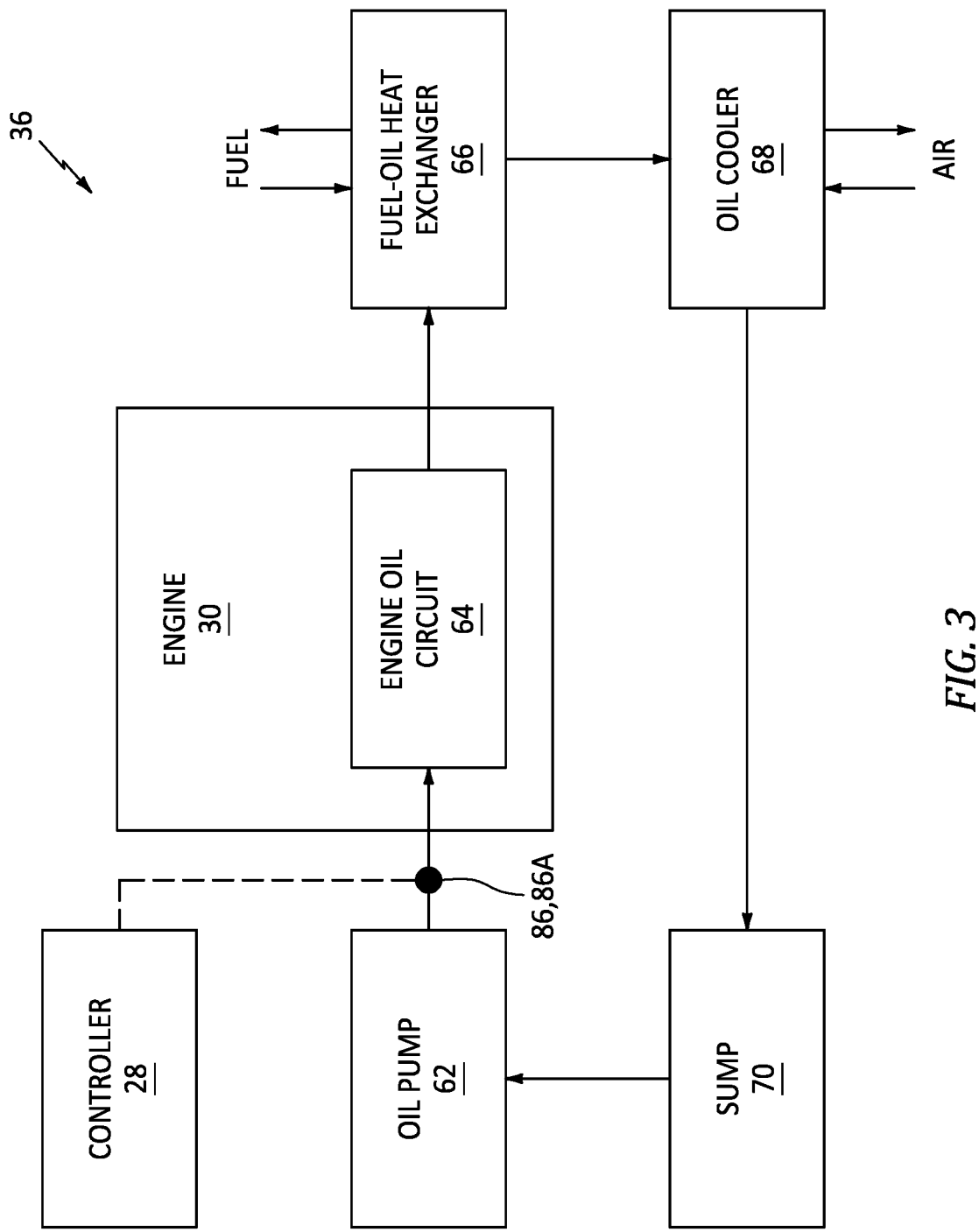
FIG. 3 illustrates a block diagram of an oil system for use with an aircraft APU assembly, in accordance with one or more embodiments of the present disclosure.

FIG. 3 illustrates a block diagram of an exemplary configuration of the oil system 36. The oil system 36 of FIG. 3 includes the oil pump 62 (see FIG. 2), an engine oil circuit 64 of the gas turbine engine 30, a fuel-oil heat exchanger 66, an oil cooler 68, and an oil sump 70 disposed within the APU compartment 1006. The oil pump 62 is connected in fluid communication with the oil sump 70. The oil pump 62 is configured to draw oil from the oil sump 70 and direct the oil to the engine oil circuit 64. The engine oil circuit 64 includes one or more oil-lubricated and/or oil-cooled components of the gas turbine engine 30 (e.g., bearing assemblies, the shaft 56, etc.). Relatively high-temperature oil from the engine oil circuit 64 may be directed into the fuel-oil heat exchanger 66 to transfer head to fuel before the fuel is injected into the combustor 42 (see FIG. 2). The oil may subsequently be directed into and cooled by the oil cooler 68. The oil cooler 68 may receive ambient air from the air intake system 24 (see FIG. 1) or another air source for cooling the oil. However, the oil cooler 68 of the present disclosure is not limited to the use of air as a cooling medium. Oil cooled by the oil cooler 68 may be directed to or may otherwise return to the oil sump 70. Components of the oil system 36, including the oil pump 62, the engine oil circuit 64, the fuel-oil heat exchanger 66, the oil cooler 68, and the oil sump 70 may be interconnecting using any suitable conduit (e.g., pipe, tube, hose, etc.). The present disclosure is not limited to the foregoing exemplary configuration of the oil system 36, and the oil system 36 may include additional or alternative components such as, but not limited to, control valves, pumps, pressure relief valves, oil tanks, fuel heaters, oil filter bowls, and the like.

Referring again to FIG. 1, the air intake system 24 is configured to selectively direct ambient air to the gas turbine engine 30 (e.g., the air inlet 38; see FIG. 2). The air intake system 24 of FIG. 1 is configured as a ram air intake system. The air intake system 24 of FIG. 1 includes an intake door 72 of the housing 1004, an intake duct 74, and a door actuator 76.

The intake door 72 is pivotably mounted to a fixed structure of the housing 1004, for example, by one or more hinges 78. The intake door 72 is pivotable between and to a closed position (e.g., a fully closed position), an open position (e.g., a fully open position), and a plurality of intermediate positions between the closed position and the open position. In the closed position, the intake door 72 may be positioned in an air opening 1014 of the housing 1004 form a substantially continuous outer surface of the aircraft 1000 with the housing 1004. In the closed position, the intake door 72 may obstruct (e.g., completely block) ambient air from flowing to the air inlet 38. In the open position or an intermediate position, the intake door 72 may direct ambient air to the air inlet 38 through the intake duct 74. In the open position or the intermediate positions, the allows airflow to pass to the air inlet 38. The intake door 72 may be positioned in the open position or an intermediate position to control a flow rate of the ambient air to the air inlet 38. For example, the intake door 72 may be pivoted in an open direction (e.g., toward the open position) to increase a flow rate of ambient air to the air inlet 38 and the intake door 72 may be pivoted in a closed direction (e.g., toward the closed position) to decrease a flow rate of ambient air to the air inlet 38.

The intake duct 74 extends between and to the air opening 1014 and the air inlet 38 to direct ambient air from the air opening 1014 to the air inlet 38 within the intake door 72 in the open position or an intermediate position.

The door actuator 76 is operatively connected (e.g., coupled) to the intake door 72 and configured to control a position of the intake door 72 by positioning (e.g., pivoting) the intake door 72 in the open position, the closed position, and the intermediate positions. The door actuator 76 may be configured as a hydraulic actuator, a pneumatic actuator, an electro-mechanical actuator, or another suitable actuator for pivoting the intake door 72 between the open position, the closed position, and the intermediate positions.

The fire-detection system 26 of FIG. 1 includes a plurality of fire-detection sensors 80 disposed within the APU compartment 1006. For example, the fire-detection sensors 80 of FIG. 1 include a first fire-detection sensor 80A mounted on the housing 1004, a second fire-detection sensor 80B mounted on the firewall 1008, and a third fire-detection sensor 80C mounted on the door 1012. The present disclosure, however, is not limited to the foregoing exemplary fire-detection sensor positions or to any particular number of fire-detection sensors 80. Each of the fire-detection sensors 80 may include an overtemperature sensor (e.g., a temperature measurement element) and/or a fire sensor (e.g., a combustion gas and/or smoke sensor) configured to identify a fire in the APU compartment 1006 and/or a condition representative of a fire in the APU compartment 1006. The fire-detection system 26 may additionally include one or more fire-extinguishing or fire-suppressing systems or components (e.g., fire-extinguishing bottles containing a pressurized fire suppressant).

Referring to FIGS. 1 and 2, the controller 28 includes a processor 82 connected in signal communication with memory 84. The processor 82 may include any type of computing device, computational circuit, processor(s), CPU, computer, or the like capable of executing a series of instructions that are stored in the memory 84. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the APU assembly 20 to accomplish the same algorithmically and/or by coordination of components of the APU assembly 20. The memory 84 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 28. The controller 28 may include, or may be in communication with, an input device that enables a user to enter data and/or instructions, and may include, or be in communication with, an output device configured, for example to display information (e.g., a visual display or a printer), or to transfer data, etc. Communications between the controller 28 and other electrical and/or electronic components (e.g., controllers, sensors, etc.) may be via a hardwire connection or via a wireless connection. A person of skill in the art will recognize that portions of the controller 28 may assume various forms (e.g., digital signal processor, analog device, etc.) capable of performing the functions described herein. The controller 28 may be a single electronic processing unit or, alternatively, may be formed by a plurality of discrete electronic processing units, which discrete electronic control units may be connected in signal communication with one another.

The controller 28 is operatively connected (e.g., connected in signal or electrical communication) to door actuator 76 to control the door actuator 76 to position the intake door 72 in the open position, the closed position, and the intermediate positions. The controller 28 may be connected in signal communication with the fire-detection sensors 80. The controller 28 may be connected in signal communication with one or more sensors 86 of the APU assembly 20 such as, but not limited to, an oil flow sensor 86A for the oil system 36 (see FIG. 3), a shaft rotation speed sensor 86B for the shaft 56, an altitude sensor 86C, an ambient air pressure sensor 86D, an ambient air temperature sensor 86E, and/or an airspeed sensor 86F. The controller 28 may form or otherwise be part of an electronic engine controller (EEC) for the APU 22 and its gas turbine engine 30. The EEC may control operating parameters of the gas turbine engine 30 including, but not limited to, fuel flow, stator vane position (e.g., variable compressor inlet guide vane (IGV) position), compressor air bleed valve position, shaft (e.g., shaft 56) torque and/or rotation speed, etc. so as to control an engine power or performance of the gas turbine engine 30. The EEC may modulate fuel flow to the combustor 42 to obtain a desired output power of the gas turbine engine 30. The EEC may shut down the gas turbine engine 30 (e.g., stop fuel flow to the combustor 42) in response to identification of a fire condition in the APU compartment 1006 (e.g., by the fire-detection system 26).

Aircraft engine assemblies, such as the APU assembly 20, may be subject to various governmental regulations and other safety standards with respect to fire safety and resiliency. Engine components may be required to demonstrate fire-resistant and/or fireproof configurations. For example, an aircraft engine component may be classified as fire resistant if the engine component is capable of continued operation while exposed to a fire source for at least five minutes. For further example, an aircraft engine component may be classified as fireproof if the engine component is capable of demonstrating fire resistance and the engine component is capable of resisting leakage of a hazardous quantity of flammable fluid (e.g., fuel) for at least ten additional minutes.

We have observed that during operation of an oil system for an aircraft engine, the oil flow may facilitate dissipation of heat from a fire source, thereby cooling and protecting oil-cooled components from the fire source. For example, the oil flow may facilitate protection of heat sensitive components (e.g., heat exchangers) disposed outside a casing or other housing of the aircraft engine. However, when the aircraft engine is in a shutdown condition, the associated oil system may generally be inactive. The present disclosure APU assembly 20 facilitates operation of the oil system 36 with the gas turbine engine 30 in a shutdown condition, to facilitate cooling and protection of APU 22 components in the event of a fire condition in the APU compartment 1006.

Referring to FIGS. 1-3, operation of the APU assembly 20 will be described in further detail. It should be understood, however, that aspects of the present disclosure may be equally applicable to other aircraft engine configurations, and the present disclosure is not limited to the particular configuration of the APU assembly 20. The controller 28 may control and coordinate operation of components of the APU assembly 20 to facilitate cooling and protection of APU assembly 20 components in the event of a fire condition in the APU compartment 1006. For example, the processor 82 may execute instructions stored in memory 84, thereby causing the controller 28 and/or its processor 82 to execute or otherwise control the performance and operation of the APU assembly 20 and its components.

The controller 28 may identify a fire condition which is indicative of a fire within the APU compartment 1006. For example, the controller 28 may identify the fire condition based on receipt of a signal from one or more of the fire-detection sensors 80 indicating the presence of a fire condition (e.g., a high-temperature condition) within the APU compartment 1006. Alternatively, the controller 28 may receive a signal indicative of a fire condition in the APU compartment 1006 from an electronic control system of the aircraft 1000, the fire-detection system 26, or another electronic control system. The controller 28 may take one or more actions in response to identification of a fire condition within the APU compartment 1006. The controller 28 may initiate a shutdown of the gas turbine engine 30 (e.g., by stopping fuel flow to the combustor 42). The controller 28 may generate a warning signal (e.g., an audible alarm, a warning light, etc.) for a pilot or other operator of the aircraft 1000.

The controller 28 controls a position of the intake door 72 in response to identification of the fire condition. In particular, with the APU 22 (e.g., the gas turbine engine 30) in a shutdown condition, the controller 28 positions the intake door 72 in the open position or an intermediate position to direct ambient air into the intake duct 74 and the air inlet 38. The ambient air directed into the air inlet 38 flows through the gas turbine engine 30 causing the rotational assembly 50 to windmill (e.g., rotate), thereby driving operating of the oil pump 62 to direct and circulate oil flow through the oil system 36 and to dissipate heat from APU assembly 20 components caused by exposure to a fire source. Accordingly, the APU assembly 20 facilitates fire resistance and fireproofing characteristics of APU assembly 20 components.

The controller 28 may determine a position (e.g., a fire position) of the intake door 72, in response to identification of the fire condition, and control the door actuator 76 to position the intake door 72 in the fire position. With the APU 22 (e.g., the gas turbine engine 30) in a shutdown condition, the intake door 72 may generally be in the closed position (e.g., to minimize aircraft 1000 drag during flight). Accordingly, the controller 28 may control the door actuator 76 to position the intake door 72 in an open direction from the closed position the fire position, which fire position is the open position or an intermediate position. Alternatively, the controller 28 may control the door actuator 76 to position the intake door 72 in an open direction or a closed direction from any initial intake door 72 position to the fire position, which fire position is the open position or an intermediate position. The fire position of the intake door 72 may be a predetermined position. The predetermined fire position may be based, for example, on worst case ambient air flow conditions to facilitate at least a minimum amount of oil flow through the oil system 36. Alternatively, the fire position of the intake door 72 may be dynamically determined by the controller 28. For example, the controller 28 may determine the fire position of the intake door 72 based on an estimated or otherwise determined flow rate or mass flow rate of ambient air into the air inlet 38 using measured or determined ambient air conditions such as, but not limited to, altitude, air temperature, air pressure, airspeed, and/or air density (e.g., using the sensors 86).

The controller 28 may control the position of the intake door 72 by continuously controlling (e.g., modulating) the fire position of the intake door 72 based on a measured flow rate of oil through the oil system 36 (e.g., using the oil flow sensor 86A). For example, the controller 28 may modulate the fire position of the intake door 72 using a closed-loop process to maintain the measured flow rate of oil through the oil system 36 within a flow rate range. The flow rate range may be selected to maintain sufficient cooling of APU assembly 20 components (e.g., oil system 36 components such as the fuel-oil heat exchanger 66, the oil cooler 68, a fuel heater, an oil filter bowl, or any other component of the oil system 36 which may be required to satisfy fire safety regulations) by the oil system 36 during fire conditions. Alternatively, for example, the controller 28 may modulate the fire position of the intake door 72 to maintain the flow rate of oil through the oil system 36 within a flow rate range by measuring and using a rotation speed of the rotational assembly 50 (e.g., using the shaft rotation speed sensor 86B) to estimate the flow rate of oil through the oil system 36. Alternatively, for example, the controller 28 may module the fire position of the intake door 72 to maintain the flow rate of oil through the oil system 36 within a flow rate range by measuring and using a flow rate or mass flow rate of ambient air into the air inlet 38 or an intake door 72 position to estimate the flow rate of oil through the oil system 36.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft, the assembly comprising:
    an aircraft housing forming a compartment within the aircraft housing, the aircraft housing includes an intake door, and the intake door is movable between a closed position, an open position, and intermediate positions between the closed position and the open position;
    an auxiliary power unit (APU) disposed within the compartment, the APU includes an engine, the engine includes an air inlet and a rotational assembly, the air inlet is fluidly connected to the intake door, the intake door in the closed position blocks airflow to the air inlet, and the intake door in the open position and the intermediate positions allows airflow to pass to the air inlet;
    an oil system including an oil pump, the oil pump is operatively connected to the rotational assembly to be driven by rotation of the rotational assembly to pump oil through the oil system;
    a door actuator operatively connected to the intake door, the door actuator is operable to position the intake door in the closed position, the open position, and the intermediate positions to control an ambient air flow to the air inlet; and
    a controller operatively connected to the door actuator, and the controller includes a processor in communication with a non-transitory memory storing instructions, which instructions when executed by the processor, cause the processor to:
        identify a fire condition within the compartment;
        identify a fire position of the intake door in response to identification of the fire condition, and the fire position is one of the open position or the intermediate positions; and
        control the door actuator to position the intake door in the fire position.

2. The assembly of claim 1, wherein the fire position is a predetermined one of the intermediate positions.

3. The assembly of claim 1, wherein the instructions, when executed by the processor, further cause the processor to determine the fire position based on one or more measured ambient air flow conditions for the aircraft.

4. The assembly of claim 1, wherein the one or more measured ambient air flow conditions include an altitude, an ambient air pressure, an ambient air temperature, and an airspeed.

5. The assembly of claim 1, wherein the instructions, when executed by the processor, further cause the processor to measure an oil flow rate of the oil through the oil system using an oil flow sensor and modulate the fire position based on the measured oil flow rate.

6. The assembly of claim 1, wherein the instructions, when executed by the processor, further cause the processor to measure a rotation speed of the rotational assembly using a shaft rotation speed sensor and modulate the fire position based on the measured rotation speed.

7. The assembly of claim 1, further comprising a fire detection system, the fire detection system includes at least one fire-detection sensor disposed within the compartment, the at least one fire-detection sensor is connected in signal communication with the controller, and the controller identifies the fire condition within the compartment using the at least one fire-detection sensor.

8. The assembly of claim 1, wherein the oil system includes a fuel-oil heat exchanger, and the oil pump is configured to pump the oil through the fuel-oil heat exchanger.

9. The assembly of claim 1, wherein the oil system includes an oil cooler, and the oil pump is configured to pump the oil through the oil cooler.

10. The assembly of claim 1, wherein the instructions, when executed by the processor, cause the processor to control the door actuator to position the intake door in the fire position with the APU in a shutdown condition.

11. A method for controlling an oil flow rate for an oil system of an auxiliary power unit (APU) for an aircraft, the method comprising:
    identifying a fire condition within a compartment, and the APU is disposed within the compartment;
    identifying a fire position of an intake door of the aircraft in response to identification of the fire condition; and
    controlling the oil flow rate through the oil system by controlling a door actuator to position the intake door in the fire position to direct ambient air to the APU to drive rotation of a rotational assembly of the APU, driving an oil pump of the oil system with the rotational assembly, and directing oil through the oil system with the oil pump.

12. The method of claim 11, further comprising placing the APU in a shutdown condition in response to identification of the fire condition.

13. The method of claim 11, further comprising determining the fire position based on one or more measured ambient air flow conditions.

14. The method of claim 13, wherein the one or more measured ambient air flow conditions include an altitude, an ambient air pressure, an ambient air temperature, and an airspeed.

15. The assembly of claim 11, further comprising measuring the oil flow rate and controlling the fire position based on the measured oil flow rate.

16. An assembly for an aircraft, the assembly comprising:
an aircraft housing forming a compartment within the aircraft housing, the aircraft housing includes an intake door, and the intake door is movable between a closed position, an open position, and intermediate positions between the closed position and the open position;
an engine disposed within the compartment, and the engine includes an air inlet and a rotational assembly, the air inlet is fluidly connected to the intake door, the intake door in the closed position blocks airflow to the air inlet, and the intake door in the open position and the intermediate positions allows airflow to pass to the air inlet;
an oil system including an oil pump, the oil pump is operatively connected to the rotational assembly to be driven by rotation of the rotational assembly to pump oil through the oil system;
a fire detection system including at least one fire-detection sensor within the compartment;
an air intake system including a door actuator operatively connected to the intake door, the door actuator is operable to position the intake door in the closed position, the open position, and the intermediate positions to control an ambient air flow to the air inlet; and
a controller operatively connected i to the door actuator and the at least one fire-detection sensor, and the controller includes a processor in communication with a non-transitory memory storing instructions, which instructions when executed by the processor, cause the processor to:
identify a fire condition within the compartment using the at least one fire-detection sensor; and
control the door actuator to position the intake door in a fire position in response to identification of the fire condition, and the fire position is one of the open position or the intermediate positions.

17. The assembly of claim 16, wherein the fire position is a predetermined one of the intermediate positions.

18. The assembly of claim 16, wherein the instructions, when executed by the processor, further cause the processor to determine the fire position based on one or more of an ambient air pressure, an ambient air temperature, or an airspeed for the aircraft.

19. The assembly of claim 16, wherein the instructions, when executed by the processor, further cause the processor to measure an oil flow rate of the oil through the oil system and modulate the fire position based on the measured oil flow rate.

20. The assembly of claim 16, wherein the instructions, when executed by the processor, further cause the processor to control the door actuator to position the intake door in the fire position with the engine in a shutdown condition.

* * * * *